April 19, 1955 M. R. BARUSCH ET AL 2,706,740
PROCESS FOR PRODUCING UNSATURATED HYDROCARBONS AND
OXYGEN COMPOUNDS OF HYDROCARBONS BY
OXIDIZING HYDROCARBON GASES
Filed March 17, 1951
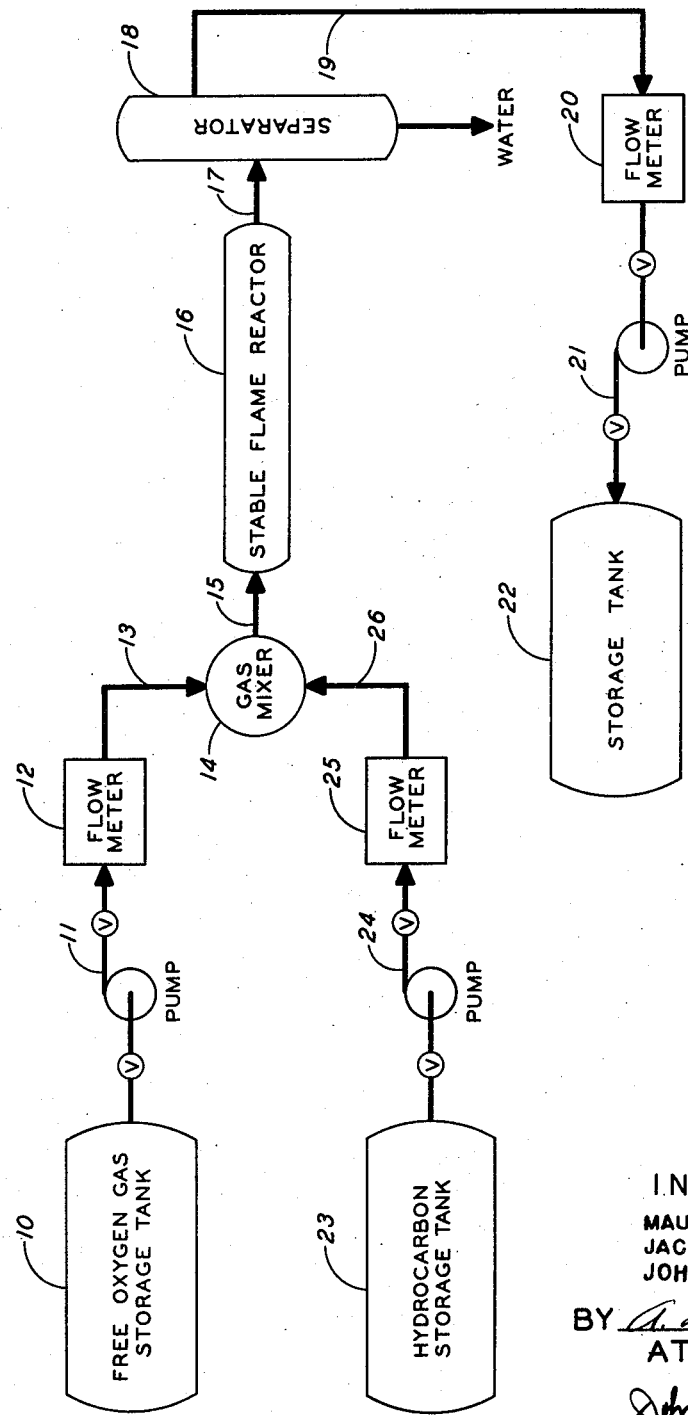
INVENTORS
MAURICE R. BARUSCH
JACK Q. PAYNE
JOHN T. NEU
BY *A. L. Snow.*
ATTORNEY
*John Stoner, Jr.*
AGENT

United States Patent Office 2,706,740
Patented Apr. 19, 1955

2,706,740

PROCESS FOR PRODUCING UNSATURATED HYDROCARBONS AND OXYGEN COMPOUNDS OF HYDROCARBONS BY OXIDIZING HYDROCARBON GASES

Maurice R. Barusch, Richmond, Jack Q. Payne, Concord, and John T. Neu, Berkeley, Calif., assignors to California Research Corporation, San Francisco, Calif., a corporation of Delaware Application March 17, 1951, Serial No. 216,221

17 Claims. (Cl. 260—679)

This invention relates to the preparation of oxidation products by controlled oxidation of hydrocarbon gases and other suitable materials. More particularly, the invention relates to the preparation of oxidation products such as alcohols, aldehydes, ketones, acids, ethers, unsaturated hydrocarbons, etc. by the reaction of a gaseous mixture of hydrocarbon or other suitable carbon and hydrogen-containing fuel and oxygen in a stable, cool flame or series of stable flames containing cool flames, said cool flames being characterized by temperatures substantially below those of normal hot flames.

It is known that oxidation products such as alcohols, aldehydes, ketones, acids, ethers, unsaturated hydrocarbons, etc. may be obtained by incomplete combustion of hydrocarbon gases. Such processes invariably have been subject to disadvantages. For example, large amounts of carbon are ordinarily deposited in the reaction zone due to uncontrolled combustion of the hydrocarbons resulting in the formation of elemental carbon. These deposits of carbon make it necessary to either interrupt the process periodically and clean out the carbon deposits or install continuously operating carbon-removing devices, such as rotating cold cylinders and scrapers in the reaction zone.

Further disadvantages inherent in the known processes of preparing oxidation products from hydrocarbon gases by incomplete combustion are the high temperatures involved and the low yields of oxidation products normally obtained. The high temperatures encountered in such processes give rise to problems of heat transfer and require the use of special equipment capable of withstanding intense heat. The low yields of oxidation products not only give an economically unfavorable material balance, but also result in the production of complex heterogeneous mixtures of combustion products from which it is very difficult to separate the desired oxidation products. Although catalysts have been employed to improve the yields of oxidation products, they generally have only a limited effect on the reaction and constitute an additional expense to an already uneconomical process.

It has now been found that oxidation products such as alcohols, aldehydes, ketones, acids, ethers, oxides, unsaturated hydrocarbons, etc. can be prepared by passing a gaseous mixture of a non-aromatic hydrocarbon or other suitable material as hereinafter disclosed and a free oxygen-containing gas through an elongated reaction zone wherein the mixture is slowly oxidized in a stable, cool flame or series of stable flames containing cool flames. The initial linear velocity of the gaseous mixture in the reaction zone must be substantially constant and of such a magnitude that the linear velocity at the flame or series of flames is at least equal to the velocity of cool flame propagation, preferably at least 2 cm. per second. The resulting oxidation products are withdrawn from the reaction zone downstream from the stable flame or series of flames.

The preparation of oxidation products of hydrocarbons according to the present process avoids all the aforementioned disadvantages of the previously known methods. Practically no carbon is deposited in the reaction zone, thereby making it possible to operate continuously without intermittent interruptions for cleaning or installation of elaborate and expensive equipment for the continuous removal of by-product elemental carbon. The slow oxidation of the hydrocarbon and oxygen gaseous mixture in cool flames entails the use of only moderate temperatures much lower than normal combustion temperatures, thereby largely eliminating heat transfer problems and the necessity for special equipment capable of holding up under extremely high temperature conditions. The yields of desired oxidation products are improved, resulting in reaction mixtures which lend themselves more readily to conventional separation processes, while the added expense of catalysts is also avoided.

The phenomena of cool flames or cold flames as they are often called, has long been known. They are said to have been discovered by W. H. Perkin, who described their observance in the Journal of the Chemical Society, volume 41, at page 363, in 1882. These cool flames occur when vaporous mixtures of fuel and oxygen or free oxygen-containing gases are heated sufficiently to spontaneously give a feeble, blue luminescence. They are called cool flames because they are characterized by a flame front, just as in the case of ordinary flames, but give only a small rise in temperature, usually in the order of magnitude of about 100° C.

Although cool flames themselves are known, the stable cool flames or series of flames containing cool flames of the present process apparently have not been recognized or used before. Whereas heretofore the cool flames that were obtained were permitted to move freely within the reaction zone and propagate themselves upon gaseous mixtures wherever they came in contact, the cool flames or series of flames containing cool flames utilized in the preparation of oxidation products of hydrocarbons and other fuels according to this invention are stabilized so that they remain practically stationary in the reaction zone during the slow oxidation reaction in which the gaseous materials are fed at a substantially constant linear velocity into them. Some oxidation products of hydrocarbons, for example, unsaturated hydrocarbons such as acetylene, are found only after the gaseous hydrocarbon and oxygen mixture has been passed through a series of at least two stable, cool flames.

The mechanism whereby the alcohols, aldehydes, ketones, acids, esters, ethers, oxides, unsaturated hydrocarbons and similar oxidation products of hydrocarbons and related oxygen-containing compounds are obtained according to the process of this invention is not known with certainty. Many reactions occur simultaneously and it is a particular advantage that with the techniques of this invention it is possible to cause various selected reactions to predominate by altering conditions and thus altering the flame phenomena. The following equations illustrate the probable course of some of the reactions involved.

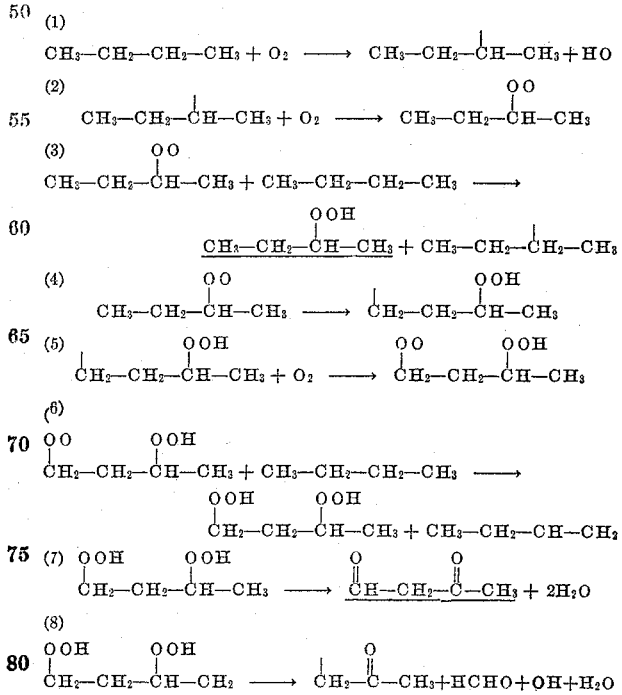

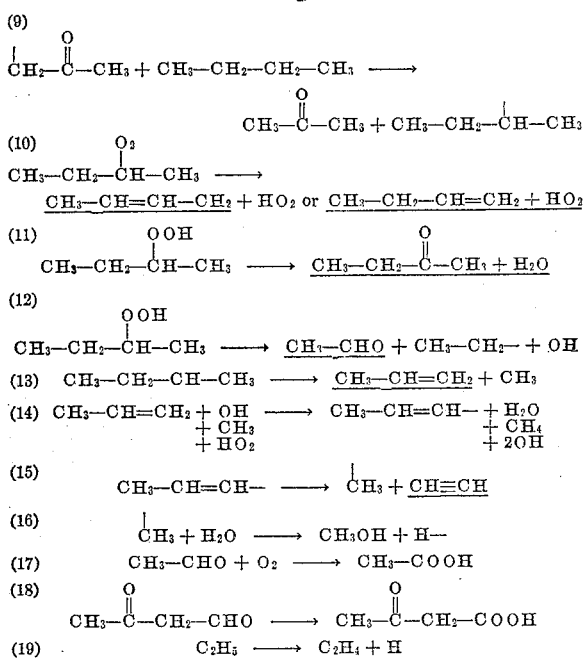

(19)  $C_2H_5 \longrightarrow C_2H_4 + H$

In the foregoing equations n-butane has been taken as an example. As shown in Equation 1 a chain reaction may be initiated by the reaction of oxygen and butane. The butyl radicals thus produced react with oxygen to form peroxy radicals. Secondary butyl radicals and secondary butyl peroxy radicals are shown in the reaction as they are believed to predominate. However, some primary analogous compounds also are probably formed. The peroxy radicals may in turn react with more n-butane (3) to give butyl peroxide and an additional butyl radical. In this manner Reactions 2 and 3 may repeat in chain fashion. The peroxy radicals formed in (2) may undergo another reaction as shown in (4). Here the peroxy group removes a hydrogen from its own molecule. A $\beta$ hydrogen has been taken as an example, although a similar reaction could occur with an $\alpha$ hydrogen. A butyl radical containing the hydroperoxide group is thus formed. This reacts further (5) with oxygen to give the peroxy radical indicated which may react with more butane (6) to give a diperoxide plus a butyl radical. Thus another chain reaction is possible, represented by Reactions 2, 4, 5 and 6. The diperoxide may decompose (7) to butanal-3-one which may be isolated as a reaction product or may decompose (8) to formaldehyde, water, hydroxy radical and the acetone-free radical. The acetone radical may react with more butane (9) to produce acetone and butyl radical. Still a further path of peroxide decomposition is shown by (10) where $HO_2+1$ or 2 butene is formed. Equations 11, 12 and 13 show alternate paths of peroxide decomposition. In (11) methyl ethyl ketone and water are formed. In (12) formaldehyde ethyl and hydroxyl radicals are formed. In (13) propylene and methyl radical are produced. As shown in (14), the propylene may react with a free radical to produce the free radical of propylene which can decompose (15) to acetylene and methyl radical. Methyl radicals may react (16) with water to yield methyl alcohol and hydrogen.

The above equations illustrate a possible means of production of many of the oxidation products isolated. However, these products also may be oxidized further. Equations 17 and 18 illustrate how acids may be formed from aldehydes. Also, all of the free radicals produced in the process must react further as they are unstable. Equation 19 illustrates how the ethyl radical, for example, may decompose to produce ethylene and a free radical. Other free radicals may react with other molecules present. For example, OH or $CH_3$ may react with butane to produce water or methane plus butyl radical which may then be oxidized. Reactions of this sort explain the autoaccelerating nature of the process.

The above reactions are illustrative only. In general, the products formed can be further oxidized to other products. Thus, usually lower homologues of the organic compounds are formed in the process. Some higher homologues also are formed by alkylation of molecules with the alkyl-free radicals present.

The specific oxidation products which may be prepared according to this invention include alcohols such as methanol, ethanol, propanol, butanol, 2-butanol, 2-methyl-2-propanol, pentanol, hexanol, octanol, etc. Aldehydes, such as formaldehyde, acetaldehyde, propionaldehyde, butyraldehyde, etc., as well as ketones, such as acetone, methylethyl ketone, etc. also may be produced. Various organic acids of the type such as formic acid, acetic acid, propionic acid, butyric acid, etc. as well as the hydroxy and keto analogs thereof and acids of undetermined constitution are illustrative of some of the other oxidation products which are conveniently prepared by the method of this invention. Oxides and peroxides, for example, ethylene oxides, propylene oxides, butyl peroxides, etc.; unsaturated hydrocarbons of the type illustrated by olefins, such as ethylene, propylene, butylene; diolefins, such as butadiene, etc.; acetylenic compounds, such as acetylene, propyne, butynes, etc., may also be produced as oxidation products by the process of this invention.

The stable, cool flame and series of flames containing cool flames of the present process are obtained by introducing a gaseous mixture of hydrocarbons or fuels of the types more fully described hereafter and oxygen or free oxygen-containing gas at a substantially constant linear velocity in excess of a critical minimum rate to an elongated reaction zone which has been heated by suitable means to a temperature which, in combination with the pressure of the system, will cause the mixture to spontaneously produce the desired stable, cool flame or series of flames containing cool flames. These flames are all visible to the human eye in darkened surroundings. As mentioned above, the stable, cool flames are characterized by their feeble, blue luminescence. They possess flame fronts somewhat similar to those of ordinary hot flames, but usually more localized and are accompanied by only a small increase in temperature. In the series of stable flames containing cool flames, the second succeeding flame may be similar in appearance to the first flame or it may be characterized by a more intense blue luminescence. Additional flames of the series may then occur further downstream which sometimes produce a yellow luminescence accompanied by a slightly higher rise in temperature.

In the stable cool flames and series of flames containing cool flames as described above, oxygen-containing oxidation products such as the alcohols, aldehydes, ketones, acids, esters, oxides, peroxides, ethers, etc., as previously mentioned, are produced principally in the pale blue type of cool flame which is also usually the first flame in the series of flames containing cool flames. Some unsaturated hydrocarbons, such as olefins, diolefins, etc. are formed in the pale blue flames and usually are produced in even greater yield in the more intense blue flames. In the series of flames it is the subsequent intense blue and yellow flames utilizing products of the first cool flame which produce highly unsaturated hydrocarbons, such as acetylene, in substantial quantities.

Various aliphatic and cycloaliphatic hydrocarbons and mixtures thereof are utilized as feed stock in the preparation of oxidation products according to the principles of this invention. The hydrocarbons may be saturated or unsaturated in nature. They may be of either branched-chain, straight-chain, or cyclic molecular structure. Naphthenic hydrocarbons and mixtures thereof derived from petroleum are suitable. Although the hydrocarbons from which acetylene, etc. are produced by this process are non-aromatic in nature, mixtures of them containing minor amounts of aromatic hydrocarbons, as in the case of petroleum products, may be used. Specifically, the hydrocarbons charged in any particular operation of the process according to this invention should possess vapor pressures at the temperature of operation at least equal to the pressure used. For example, saturated and unsaturated aliphatic and cycloaliphatic hydrocarbons and mixtures thereof having vapor pressures of at least 50 mm. at about 500° F. are suitably adapted to the present process. For present purposes hydrocarbons containing about 2 to about 12 carbon atoms, such as ethane, ethylene, propane, propylene, butane, isobutane, butenes, pentane, isopentane, pentenes, cyclopentane, cyclopentenes, etc. are particularly satisfactory, while the hydrocarbons of from 3 to 6 carbon atoms such as propane, propylene, butane, isobutane, butenes, pentane, isopentane, pentenes, cyclopentane, cyclopentenes, etc. are preferred.

In addition to the non-aromatic hydrocarbons of the preceding paragraph, other suitable materials such as the oxygen-containing organic compounds of related carbon and hydrogen structure may be used for feed. Like their corresponding hydrocarbon feeds, the oxygen-containing compounds should possess vapor pressures at least equal to the pressure utilized in the process, usually at least about 50 mm. Hg at 500° F. They should be aliphatic or cycloaliphatic in structure and should, more suitably, contain from about 2 to about 12 carbon atoms and preferably from about 3 to about 6 carbon atoms. Illustrative compounds are the aldehydes such as acetaldehyde, propionaldehyde, butyraldehyde, etc., ketones such as dimethyl ketone, methyl ethyl ketone, methyl propyl ketones, butanal-3-one, 2,4-pentanedione, etc., ethers such as ethyl ether, propyl ether, isopropyl ether, etc., oxides such as ethylene oxide, propylene oxides, etc., alcohols such as ethyl alcohol, propyl alcohols, butyl alcohols, etc., as well as mixtures thereof, including mixtures of hydrocarbons containing them. Suitable oxygen-containing organic compounds for charging may be derived from various sources, as, for example, from the oxidation of hydrocarbons by any satisfactory means, including processes utilizing normal flames, cool flames, etc.

The utility of oxidation products of cool flames as charging stocks makes it possible to adapt the process of this invention to a multi-stage system wherein the products of a first series of stable cool flame reactions may be purified, separated, concentrated, etc. and then subjected to further stable cool flame reactions. In such a system side reactions may be minimized resulting in greatly enhanced yields of the desired oxidation products.

The oxidizing gases to be mixed with the feed may be any free oxygen-containing gases. Pure oxygen or mixtures of oxygen and inert gases such as nitrogen, helium, carbon dioxide, etc. in various proportions may be used. For the purposes of the present process, air is particularly suitable because of its ready availability.

The proportions of hydrocarbon or other fuel and oxygen or free oxygen-containing gas in the gaseous mixture to be introduced to the cool flame reactor may vary from a small amount of oxygen just sufficient to cause the formation of the cool flames up to stoichiometrical amounts sufficient to convert the hydrogen and carbon entirely to $CO_2$ and water. When the free oxygen-containing gas is substantially diluted with inert gases as in the case of air, oxygen may be used in amounts as large as two and three times stoichiometrical proportions. Ordinarily, molar ratios of fuel to oxygen ranging from about 5:1 to about 1:20 may be suitably employed. In the present process when the preferred hydrocarbons such as propanes, butanes, pentanes, hexanes, etc. are used, molar ratios of fuel to oxygen in the range of from about 3:1 up to about 1:8 are preferred, while molar proportions of from about 1:1 up to about 1:4 are still more satisfactory.

The aliphatic hydrocarbons or other fuels and free oxygen-containing gas may be mixed by any suitable means prior to introduction into the reaction zone. The mixing may be carried out at temperatures and pressures corresponding to those utilized in the reactor. It is frequently advantageous, however, to employe temperatures and pressures while mixing either above or below those of the reactor. For example, when normally gaseous hydrocarbons are used in the feed the mixing may be conveniently carried out at temperature below and/or pressures above those of the reaction zone.

The gaseous mixture of fuel and free oxygen-containing gas is passed into the cool flame reactor at a substantially constant velocity. As the reaction proceeds, there is a net increase in molecules resulting in an increasing linear velocity as the mixture passes through the reaction zone. The term "linear velocity" as used herein, unless otherwise specified, refers to initial linear velocity which can be determined and controlled with the greatest precision.

A satisfactory initial flow rate for the gaseous mixture of hydrocarbon and oxygen reactants may vary widely so long as it exceeds a critical minimum velocity which at the cool flame zone gives a linear flow rate at least equal to the velocity of the cool flames, or the rate at which they propagate. Ordinarily, the flow rate should not reach that at which turbulent flow is obtained, since mixing of the partially reacted materials and freshly introduced hydrocarbons may thereby occur and suppress formation of the desired stable, cool flame or series of flames containing cool flames. Linear velocities of from about at least 2 cm. per second up to about 500 cm. per second are suitable, while those from about 5 cm. per second to 300 cm. per second are still more satisfactory with from about 10 cm. per second to about 200 cm. per second being preferred when the aforementioned light hydrocarbons of from 3 to 6 carbon atoms are utilized.

The stable flame reaction zone may be operated at various pressure and temperature conditions so long as the two combined are sufficient to promote spontaneous, stable, cool flame formation from the hydrocarbon and free oxygen-containing gas reactants. Once the desired stable, cool flame or series of flames containing cool flames is obtained, it is possible to decrease the pressure and/or temperature to conditions not sufficient to cause spontaneous formation of the flames and still maintain the stable, cool flame system. The cool flame or flames may also be obtained and the desired reactions commenced initially at these lower pressures and temperatures through the use of a "hot spot" or high temperature area induced by a hot wire or other localized heating means. It is sometimes advantageous to operate under such conditions since greater yields and better operating economy often may be obtained at the lower pressures or temperatures.

For any particular pressure and fuel to oxygen ratio employed in the process, it is only necessary to gradually raise the temperature of the reaction zone until the gaseous mixture forms the desired stable, cool flame or series of flames containing cool flames. Either the pressure or the amount of oxygen may be varied in the same way to obtain the desired flames at any given reaction temperature and fuel to oxygen ratio or pressure. Depending on the particular fuels being reacted, the pressure may vary from about 0.05 atmosphere up to as high as 15 atmospheres, the lower pressures being necessary for the heavier and less volatile fuels. For hydrocarbons of from about 2 to 12 carbon atoms, pressures ranging from about 200 to about 1,000 mm. of Hg are most satisfactory for forming the series of stable flames containing cool flames in which unsaturated hydrocarbons are produced in greatest amounts, while in the case of propanes, butanes, pentanes, hexanes, etc., pressures in the range of from about 300 to 500 mm. of Hg are preferred. Substantially atmospheric pressures are particularly satisfactory for the production of oxygen-containing oxidation products and add considerably to convenience of operation in the process. As already mentioned, the temperature in the reactor initially may be any temperature sufficient to cause the gaseous mixture to spontaneously form the desired stable, cool flame or series of flames containing cool flames. Reactor temperatures in the range of about 400 to 1,000° F. are particularly suitable and those in the range of from about 500 to about 800° F. are still more satisfactory when the preferred classes of hydrocarbons are employed.

In the production of oxidation products according to the process of this invention as described above, the free oxygen-containing gas and the fuel preheated, if necessary, to gasify, may be blended in any type of equipment suitable for the mixing of gases. Many different combinations of pumps, valves and flow regulators may be utilized to introduce the feed into the cool flame reaction zone. The reactor itself is desirably of an elongated nature, usually of from about 0.005 to about 30 sq. in. cross-sectional area and at least 0.5 foot in length. For present purposes it is preferably maintained in a horizontal position. Ordinarily, horizontal tubes or bundles of tubes having an inside diameter of from about 0.25 to 1.5 inches, or a cross-sectional area of from about 0.2 to about 2 sq. in., are most satisfactory. Tubes of such a diameter and from about 1.5 to 20 feet in length are preferred, the longer tubes being employed when the higher linear velocities for the gaseous reactants are utilized. The tubes may be heated by any suitable means either by electrical heating elements or heating baths involving the use of hot air, liquid, etc. The products resulting from the stable, cool flame reactions may be removed downstream from the desired cool flame or series of flames containing cool flames and conducted through any suitable apparatus for separating the water formed in the reaction.

The accompanying drawing is a simplified schematic flow diagram of the present process. In the drawing, tanks 10 and 23 are for storing of the free oxygen-containing gas and the hydrocarbons, respectively. Materials for the reaction are withdrawn from the tanks via lines 11 and 24 through various pumps and valves and flow meters 12 and 25. The reactants from the flow meters pass through lines 13 and 26 to a gas mixer 14, wherein they are thoroughly blended. From the mixer the gaseous mixture is introduced via line 15 to the reactor 16 wherein the stable, cool flame or series of flames containing cool flames is maintained. The products are withdrawn via line 17 and the water formed in the reaction removed in separator 18. The products are then carried through line 19, flow meter 20 and line 21, including the necessary valves and pumps for maintaining constant flow rates in the system and stored in tank 22 from whence the products may be withdrawn and the oxidation products separated as desired.

The following examples are offered in further illustration of the invention.

EXAMPLE 1

A reaction system similar to that described above and having a 7 ft. glass tube of about 0.5 inch inside diameter as the cool flame reactor was employed. It was equipped with an ice water cooled trap at its exhaust end to remove high boiling products. The tube was heated to about 625° F. in a temperature controlled furnace equipped with observation ports. Normal butane was introduced to the reactor through the gas mixer at atmospheric pressure. The introduction of the hydrocarbon first was found to be important since mixtures extremely rich in oxygen detonated violently. After the butane flow was established at about 0.30 liter per minute, oxygen was introduced through the gas mixer at a rate of 0.72 liter per minute to give a 1:2.4 fuel to oxygen molar ratio in the mixture. A stable, pale blue flame followed by an intense blue flame and a yellow flame was thus obtained about midway in the reactor. The flow regulators at this setting indicated an initial linear velocity of about 22 cm. per second. The normally gaseous reaction products effluent from the cold trap were produced at a rate of about 1.85 liters per minute. By infrared spectrum analysis the gaseous products were found to contain acetylene in a molar yield of about 46% based on butane charged.

EXAMPLE 2

An experiment similar to that described in Example 1 was carried out using a tube of about 1 inch inside diameter. A temperature of about 650° F. and a pressure of 320 mm. were employed. Pale blue and intense blue cool flames were first established in the tube and then the oxygen-fuel ratio was enriched to the rate of 1.7 liters of oxygen per minute of 0.68 liter of butane per minute at which point the blue flame, the second in the series, developed a yellow tail, or third flame. The initial linear velocity at this point was about 58 cm. per second. Gaseous products evolved from the cold trap at a rate of about 3.1 liters per minute. A sample taken of the exhaust gases from the cold trap was found to contain ethylene in a molar yield of about 40%, acetylene in a molar yield of about 23%, and methane in a molar yield of about 130%, based on butane charged.

The products of the reaction after passing through the cold trap were subjected to mass spectrum analysis and found to have the following composition:

| Product: | Mole per cent |
|---|---|
| Ethane | 0.4 |
| $CO_2$ | 2.6 |
| $O_2$ | 1.3 |
| n-Butane | 0.1 |
| Isobutane | 0.3 |
| Methane | 14.5 |
| Propylene | 0.3 |
| 2-butene | 0.1 |
| 1,3-butadiene | 0.1 |
| Ethylene | 8.8 |
| $N_2$ | 3.9 |
| $H_2$ | 26.6 |
| $C_2H_2$ | 5.1 |
| CO | 35.9 |

The per cent molar yield of the hydrocarbon based on butane charged was calculated from the above analysis as follows:

Yield =

$$\frac{\text{Total gaseous products from cold trap (liter/min.)}}{\text{Butane charged to system (liter/min.)}} \times$$

mole percent hydrocarbon in gaseous products

The collected materials in the cold trap contained, in addition to the water of combustion formed, all the higher boiling oxygen-containing organic compounds such as methyl alcohol, ethyl alcohol, formaldehyde, acetaldehyde, acetone, formic acid, methyl formate, etc.

EXAMPLE 3

Another run employing n-pentane was made in the equipment of Example 2. A constant initial linear gas velocity of about 5 cm. per second was established by introducing 300 cc. per minute n-pentane and 500 cc. per minute oxygen to the reactor. The reactor was maintained at a temperature of 600° F. and a pressure of 450 mm. Hg. As no flames were observed, the pressure was slowly increased to about 600 mm. at which pressure a series of two stable cool flames appeared. The pressure was slowly reduced to the original condition of 450 mm. while maintaining the two flames and a sample was taken. Analysis of the sample showed a molar yield of 11% acetylene based on the n-pentane charged.

EXAMPLE 4

Experimental apparatus consisting of a horizontal Pyrex tube about 7½ feet in length with an inner diameter of about 1 inch was maintained at constant temperature in an air bath controlled by a thermostat. The temperature measured when no gases were flowing through the tube was about 580° F. at the center and the longitudinal temperature gradient was less than about 11° F. When the tube was in operation, the cool incoming vapors depressed the temperature of the inlet end about 13° F. A sintered glass plate was sealed at the inlet end to prevent turbulence in the gas stream. The system was maintained at atmospheric pressure.

The fuel employed was n-pentane and was introduced by carburetion with air maintaining the carburetor at 32° F. The flow rate was adjusted so that 0.5 ml. of liquid pentane was introduced per minute. Under these conditions a single cool flame was stabilized in the tube. The product was collected from the exhaust end of the tube by means of a trap cooled in Dry Ice. This product consisted of two layers, the lower or aqueous phase being about one-sixth of the total.

From about 1900 ml. of n-pentane approximately 1100 ml. of the upper or organic phase was produced. This was concentrated to 125 ml. by evaporation at atmospheric pressure, maintaining the temperature below 50° C. The material was then further concentrated to 20 ml. by distillation at 4 mm. Hg pressure. Spectrochemical data indicated 0.7% 2,4-pentanedione in the solution thus obtained. A portion of this solution was treated with aqueous cupric acetate and the resulting enolate collected and recrystallized from benzene. A comparison of the X-ray diffraction pattern of this material with a known sample of the copper enolate of 2,4-pentanedione showed the material to be identical. Carbon-hydrogen analysis of the enolate isolated from the combustion product was as follows:

Calculated for $C_{10}H_{14}O_4Cu$ _____ C, 45.9; H, 5.4
Found _____ C, 46.0; H, 5.5

The pure dione was isolated from the remainder of the 20 ml. by distillation.

EXAMPLE 5

The same apparatus as in the previous example was employed. N-butane, 1-butene, trans-2-butene and 1,3-butadiene were each passed through the tube with an equimolar amount of oxygen at the pressures and temperatures indicated in the table below. Initial linear velocity of the gases was 10 cm./second in each case. A single, stable cool flame was established about midway in the tube. The molar yield per pass of formaldehyde and butanal-3-one were measured spectroscopically. Although other oxidation products were formed, their yields were not investigated. The following table presents the resultant data.

*Production of formaldehyde and butanal-3-one*

| Hydrocarbon Charged | Pressure of Hydrocarbon (mm. Hg) | Pressure O₂ (mm. Hg) | Molar Yield of Formaldehyde (percent) | Molar Yield Butanal-3-one (percent) | Temp., °C. |
|---|---|---|---|---|---|
| n-butane | 200 | 200 | 10 | 0.7 | 300 |
| 1-butene | 240 | 240 | 14 | 1.1 | 300 |
| trans-2-butene | 200 | 200 | 16 | 1.3 | 300 |
| 1,3-butadiene | 125 | 125 | 5.6+ | | 300 |

The oxidation products obtained according to the process of this invention may be used in the form of reaction mixtures as evolved or they may be subjected to separation processes designed to recover specific oxidation products. Various methods of separation may be utilized, such as selective absorption of the desired products, by suitable organic solvents. Refrigeration and crystallization, fractionation by distillation, etc., as well as other means of separation may also be used to recover the desired oxidation products.

We claim:

1. A method of preparing oxidation products of hydrocarbons which comprises reacting a gaseous mixture of an aliphatic hydrocarbon containing from 3 to 6 carbon atoms per molecule with a free oxygen-containing gas in approximately equimolar proportions of hydrocarbon to oxygen in an elongated reaction zone wherein the mixture is maintained at a pressure of about one atmosphere, a reaction zone temperature of from about 500° F. to about 800° F. and a substantially constant linear velocity of about 10 cm. per second to produce a single, stable blue luminescent zone within the reaction zone and withdrawing the resulting oxidation products downstream from the luminescent zone.

2. A method of preparing oxidation products which comprises reacting a gaseous mixture of n-pentane and air in approximately equimolar proportions of oxygen to n-pentane in a reaction zone wherein the mixture is maintained at a pressure of about one atmosphere, a reaction zone temperature of about 580° F. and a substantially constant linear velocity of about 10 cm. per second to produce a single, stable blue luminescent zone within the reaction zone and withdrawing the resulting oxidation products downstream from the blue luminescent zone.

3. A method of preparing oxidation products which comprises reacting a gaseous mixture of n-butane and oxygen in approximately equimolar proportions in a reaction zone wherein the mixture is maintained at a pressure of about one atmosphere, a reaction zone temperature of about 580° F. and a substantially constant linear velocity of about 10 cm. per second to produce a single, stable blue luminescent zone within the reaction zone and withdrawing the resulting oxidation products downstream from the blue luminescent zone.

4. A method of preparing oxidation products which comprises reacting a gaseous mixture of 1-butene and oxygen in approximately equimolar proportions in a reaction zone wherein the mixture is maintained at a pressure of about one atmosphere, a reaction zone temperature of about 580° F. and a substantially constant linear velocity of about 10 cm. per second to produce a single, stable blue luminescent zone within the reaction zone and withdrawing the resulting oxidation products downstream from the blue luminescent zone.

5. A method of preparing oxidation products which comprises reacting a gaseous mixture of trans-2-butene and oxygen in approximately equimolar proportions in a reaction zone wherein the mixture is maintained at a pressure of about one atmosphere, a reaction zone temperature of about 580° F. and a substantially constant linear velocity of about 10 cm. per second to produce a single, stable blue luminescent zone within the reaction zone and withdrawing the resulting oxidation products downstream from the blue luminescent zone.

6. A method of preparing oxidation products which comprises reacting a gaseous mixture of 1,3-butadiene and oxygen in approximately equimolar proportions in a reaction zone wherein the mixture is maintained at a pressure of about one atmosphere, a reaction zone temperature of about 580° F. and a substantially constant linear velocity of about 10 cm. per second to produce a single, stable blue luminescent zone within the reaction zone and withdrawing the resulting oxidation products downstream from the blue luminescent zone.

7. A process of producing acetylene which comprises passing a gaseous mixture of an aliphatic hydrocarbon containing from 2 to 12 carbon atoms per molecule and a free oxygen-containing gas through an elongated reaction zone maintained at a pressure of from about 200 to about 1,000 mm. Hg and at a temperature of from about 400 to about 1000° F. at a substantially constant linear velocity in excess of 2 cm. per second to produce a series of at least two blue luminescent zones within the reaction zone, withdrawing the resulting reaction product downstream from the luminescent zones and separating acetylene therefrom.

8. A process for producing acetylene which comprises passing a mixture of a vaporized aliphatic hydrocarbon containing at least two carbon atoms per molecule with an amount of a free oxygen-containing gas having an oxygen content not exceeding that required for the oxidation of the hydrocarbon to carbon dioxide and water through an elongated reaction zone at a linear velocity of at least two centimers per second while maintaining a temperature in the range 400° F. to 1000° F. and a pressure in the range 0.5 to 15 atmospheres in the reaction zone, to produce a series of at least two blue luminescent zones within the reaction zones and withdrawing a reaction product mixture comprising acetylene downstream from the luminescent zones.

9. A process of producing acetylene which comprises passing a gaseous mixture of an aliphatic hydrocarbon containing from 2 to 12 carbon atoms per molecule and a free oxygen-containing gas in molar ratio of hydrocarbon to oxygen ranging from about 5:1 to about 1:20 through an elongated reaction zone at a pressure between about 200 and about 1000 mm. Hg, a temperature of from about 400 to about 1000° F. and a substantially constant linear gas velocity in excess of 2 cm. per second, to produce a series of at least two blue luminescent zones within the reaction zone, withdrawing the resulting reaction product downstream from the luminescent zones and separating acetylene therefrom.

10. A process of producing acetylene which comprises passing a gaseous mixture of an aliphatic hydrocarbon containing from 2 to 12 carbon atoms per molecule and a free oxygen-containing gas in molar ratio of hydrocarbon to oxygen ranging from about 5:1 to about 1:20 at a substantially constant initial linear velocity of from about 2 to 500 centimeters per second through an elongated reaction zone having a cross-sectional area of from about 0.005 to 30 square inches and a length of at least 0.5 feet, at a pressure between about 200 and about 1000 mm. Hg and a temperature of from about 400 to about 1000° F., to produce a series of at least two blue luminescent zones within the reaction zone, withdrawing the resulting reaction product downstream from the luminescent zones and separating acetylene therefrom.

11. A process of producing acetylene which comprises passing a gaseous mixture of aliphatic hydrocarbon containing from 2 to 12 carbon atoms per molecule and a free oxygen-containing gas in molar ratio of hydrocarbon to oxygen ranging from about 5:1 to about 1:20 at a substantially constant initial linear velocity of from about 5 to about 300 centimeters per second through an elongated reaction zone having a cross-sectional area of from about 0.2 to about 2 square inches and a length of from about 1.5 to about 20 feet, at a pressure between about 200 and about 1000 mm. Hg and a temperature of from about 400 to about 1000° F. to produce a series of at least two blue luminescent zones, withdrawing the resulting reaction product downstream from the luminescent zones and separating acetylene therefrom.

12. A process of producing acetylene which comprises passing a gaseous mixture of a cycloaliphatic hydrocarbon containing from 2 to 12 carbon atoms per molecule and a free oxygen-containing gas in molar ratio of hydrocarbon to oxygen ranging from about 3:1 to about 1:8 at a substantially constant initial linear velocity of from about 5 to about 300 centimeters per second through an elongated reaction zone having a cross-sectional area of from about 0.2 to about 2 square inches and a length of from about 1.5 to about 20 feet, at a pressure between about 200 and about 1000 mm. Hg and a temperature of from about 400 to about 1000° F. to produce a series of at least two blue luminescent zones within the reaction zone, withdrawing the resulting reaction product downstream from the luminescent zones and separating acetylene therefrom.

13. A process of producing acetylene which comprises passing a gaseous mixture of a hydrocarbon selected from the group consisting of saturated and unsaturated aliphatic and cycloaliphatic hydrocarbons containing from 3 to 6 carbon atoms per molecule and mixtures thereof and oxygen in a molar ratio of hydrocarbon to oxygen ranging from about 3:1 to about 1:8 at a substantially constant initial linear velocity of from about 5 to about 300 centimeters per second through an elongated reaction zone having a cross-sectional area of from about 0.2 to about 2 square inches and a length of from about 1.5 to about 20 feet, at a pressure between about 200 and about 1000 mm. Hg and a temperature of from about 400 to about 1000° F. to produce a series of at least two blue luminescent zones within the reaction zone, withdrawing the resulting reaction product downstream from the luminescent zones and separating acetylene therefrom.

14. A process of producing acetylene which comprises reacting butane admixed with oxygen in a molar ratio of butane to oxygen ranging from about 1:1 to about 1:4 at a constant linear velocity of from about 10 to about 200 centimeters per second through an elongated reaction zone having a cross-sectional area of from about 0.2 to about 2 square inches and a length of from about 1.5 to about 20 feet, at a pressure between about 200 and about 1000 mm. Hg and a temperature of from about 500 to about 800° F. to produce a series of at least two blue luminescent zones within the reaction zone, withdrawing the resulting reaction product downstream from the luminescent zones and separating acetylene therefrom.

15. A process of producing acetylene which comprises passing a gaseous mixture of an aliphatic hydrocarbon containing from 2 to 12 carbon atoms per molecule and a free oxygen-containing gas in molar ratio of hydrocarbon to oxygen at a fixed value in the range of from about 5:1 to 1:20 through an elongated reaction zone maintained at a fixed pressure between about 200 and about 1000 mm. Hg and varying the temperature in the range of about 400 to about 1000° F. to produce a series of at least two blue luminescent zones within the reaction zone, the linear velocity of the gaseous reactants being substantially constant and in excess of 2 cm. per second, whereby said luminescent zones are stabilized at a substantially fixed position in the reaction zone, withdrawing the resulting oxidation products downstream from the luminescent zones and separating acetylene therefrom.

16. A process of producing acetylene which comprises passing a gaseous mixture of an aliphatic hydrocarbon containing from 2 to 12 carbon atoms per molecule and a free oxygen-containing gas in molar ratio of hydrocarbon to oxygen at a fixed value in the range of from about 5:1 to 1:20 through an elongated reaction zone maintained at a fixed temperature in the range of about 400 to about 1000° F. and varying the pressure between about 200 and about 1000 mm. Hg to produce a series of at least two blue luminescent zones within the reaction zone, the linear velocity of the gaseous reactants being substantially constant and in excess of 2 cm. per second, whereby said luminescent zones are stabilized at a substantially fixed position in the reaction zone, withdrawing the resulting oxidation products downstream from the luminescent zones and separating acetylene therefrom.

17. A process of producing acetylene which comprises passing a gaseous mixture of an aliphatic hydrocarbon containing from 2 to 12 carbon atoms per molecule and a free oxygen-containing gas through an elongated reaction zone maintained at a fixed pressure between about 200 and about 1000 mm. Hg and a fixed temperature in the range of about 400 to about 1000° F. and varying the molar ratio of hydrocarbon to oxygen in said gaseous mixture within the range of from about 5:1 to about 1:20 to produce a series of at least two blue luminescent zones within the reaction zone, the linear velocity of the gaseous reactants being substantially constant and in excess of 2 cm. per second, whereby said luminescent zones are stabilized at a substantially fixed position in the reaction zone, withdrawing the resulting oxidation products downstream from the luminescent zones and separating acetylene therefrom.

References Cited in the file of this patent

UNITED STATES PATENTS

| | | |
|---|---|---|
| 1,729,711 | Curme | Oct. 1, 1929 |
| 1,963,070 | Bludworth et al. | June 19, 1934 |
| 1,965,771 | Groll et al. | July 10, 1934 |
| 1,971,728 | Perry | Aug. 28, 1934 |
| 1,995,136 | Winkler et al. | Mar. 19, 1935 |
| 2,195,227 | Sachsse | Mar. 26, 1940 |
| 2,237,301 | Burk et al. | Apr. 8, 1941 |

OTHER REFERENCES

Maccormac et al.: "Chem. Soc. Journal" (1940), pages 143 to 156.

Malherbe et al.: "Faraday Society Transaction" (1950), pages 824 to 848.